United States Patent [19]
Juhel

[11] 3,837,618
[45] Sept. 24, 1974

[54] ELECTRO-PNEUMATIC VALVE

[75] Inventor: Bernard Juhel, Epinay sur Seine, France

[73] Assignee: Compagnie des Freins et Signaux Westinghouse, Sevran, France

[22] Filed: Apr. 26, 1973

[21] Appl. No.: 354,756

[52] U.S. Cl............................. 251/129, 335/255
[51] Int. Cl............................................ F16k 31/06
[58] Field of Search ........ 251/129, 141; 335/255 X, 335/278, 297, 261, 260; 336/177

[56] References Cited
UNITED STATES PATENTS

| | | | |
|---|---|---|---|
| 2,476,794 | 7/1949 | Austin | 335/255 X |
| 2,792,195 | 5/1957 | Mosbacher | 251/129 X |
| 2,852,637 | 9/1958 | Pratt | 335/255 X |
| 2,987,293 | 6/1961 | Knudson | 251/141 |
| 3,168,242 | 2/1965 | Diener | 251/129 X |
| 3,231,233 | 1/1966 | Herion | 251/141 X |
| 3,371,684 | 3/1968 | Tissot-Dupont | 251/141 X |
| 3,552,565 | 1/1971 | Fritz | 336/177 X |
| 3,578,284 | 5/1971 | Martini | 251/129 X |
| 3,647,177 | 3/1972 | Lang | 252/129 |
| 3,653,630 | 4/1972 | Ritsema | 251/129 |

FOREIGN PATENTS OR APPLICATIONS
885,729   12/1961   Great Britain ................. 251/141

*Primary Examiner*—William R. Cline
*Assistant Examiner*—Robert J. Miller
*Attorney, Agent, or Firm*—R. W. McIntire, Jr.

[57] ABSTRACT

An electrovalve comprising a core plunger disposed in the bore of a non-magnetic tubular member for movement between end stops arranged to cooperate with the core plunger to control fluid pressure flow in passageways connected to the bore via the end stops. The tubular member is arranged to receive an induction coil in an annular recess formed about the periphery of the tubular member so as to surround a portion of the core plunger and a portion of a magnetic plug providing one of the end stops. Pole pieces at each end of the coil concentric with the bore are interconnected by an annular sleeve via which the magnetic flux lines of the coil are channeled in providing a magnetic member which connects magnetic force across the tubular member to the plug and core plunger to effect movement of the latter between its end stops when the coil is energized.

13 Claims, 4 Drawing Figures

PATENTED SEP 24 1974 3,837,618

ELECTRO-PNEUMATIC VALVE

BACKGROUND OF THE INVENTION

The present invention relates to an electrovalve consisting of a core plunger which can move between two end stops, inside a tube that carried an induction coil. The invention is particularly applicable to electrovalves with one position and two ports, or with two positions and three ports.

Already known is an electrovalve comprising a core plunger which can move inside a tube between two stops, the tube being integral with two poppets which control the flow of a fluid through a passage inside a block that is attached to the tube. This electrovalve features an induction coil disposed concentrically with the tube and surrounding the same, and a bellshaped armature arranged in such a manner that together with the core and a plug mounted toward one end of the tube to form one of its stops, a magnetic circuit is provided in which the flux created by the coil will circulate.

The magnetic circuit of such known electrovalves have substantial losses in flux. When trying to improve the magnetic circuit, one is confronted with considerable problems of cost, and with great manufacturing difficulties.

SUMMARY OF THE INVENTION

The object of this invention is to provide an electrovalve that can be built at low cost, and which will include a magnetic circuit with practically no flux losses. The invention foresees, in addition, obtaining maximum simplification of manufacture by arranging the magnetic circuit with a monoblock tube having a single bore.

The invention comprises an electrovalve composed of a core plunger which can move inside a tube of nonmagnetic material, between two end stops, the inside space of the tube being connected to at least one fluid flow passage which the core is capable of shutting off, an induction coil which surrounds the tube and is suitable for being connected to a source of electric current, and a magnetic member having good permeability also surrounding the tube and the induction coil to magnetically connect, across the tube, at least part of the peripheral surface of the core plunger to a plug of magnetic material mounted at one tube end where it forms one of its end stops. The magnetic member, the plug, and the core plunger constitute the magnetic flux circuit of the coil, the said electrovalve being characterized by the fact that the induction coil is located outside the tube in surrounding relation with part of the core and a portion of the plug, whereas the magnetic member comprises, at each end, annular pole pieces arranged at either end of the coil, which connect the said magnetic member across the tube to the plug and the core plunger respectively.

The two annular pole pieces of the magnetic member can extend over a considerable length, and can be mounted in direct contact with the tube, whereby the size of the gap between the plug or the core plunger and the corresponding annular part will be reduced and its surface area increased. The reluctance of the magnetic circuit is thereby considerably decreased, and the manufacture of the electrovalve becomes simpler and less costly.

The induction coil can be separated from the annular parts of the adjoining magnetic member by external collars which together with the tube, form the supporting structure of the coil.

Assembly can be accomplished by successively mounting, on the tube, one annular part, one collar, the induction coil, the other collar, and the other annular part, all of this assembly being tightened by the plug.

The tube and the passage for the fluid can be arranged in one single piece, either cast or machined from a bar, which will simplify the circuit of the fluid. One can also provide in this piece a single bore for the core and the plug, thus facilitating centering of the core and reducing losses in magnetic flux. In such a case the annular parts of the magnetic member can be produced by winding in place, or by providing two half-shells mounted around the induction coil, thereby simplifying the manufacture. Instead of sliding the external collars onto the tube, they can be made integral with the tube, which will further simplify manufacture.

The tube, at its end where the plug is located, can be made integral with a back-up flange for the magnetic member.

The annular pole pieces of the magnetic member can be magnetically connected to each other by a sleeve of generally annular shape which forms part of the magnetic member around the induction coil. A magnetic member composed of the annular parts and the sleeve can, for example, consist of two half-shells, joined together in an axial plane. The outer surface of the magnetic member can advantageously be of generally cylindrical shape.

The manufacture of the electrovalve becomes particularly inexpensive if at least one annular part of the magnetic member adjoining the coil is made of coiled wire or of a material of good magnetic permeability. To minimize the flux losses through eddy currents, this wire can be provided with electrical insulation on its surface.

The annular pole pieces of the magnetic member can be wound from a common wire, and assembled over the induction coil by means of a sheath for channeling the magnetic flux. The sheath connecting the pole pieces can also be made of common wire, through a continuation of the pole piece windings, for example, which further simplifies and speeds up the manufacture of the electrovalve.

The plug mounted at the end of the tube may carry around the portion nearest the core plunger and opposite the induction coil, an auxiliary coil, whose purpose is to maintain the magnetic field in the gap between the core plunger and the plug whenever the current should tend to fail, to thereby permit operation with alternating current.

The plug can incorporate a fluid passage suitable for being blocked by a poppet carried by the core plunger, when the induction coil is connected to the source of electric power supply.

Other objects and advantages of this invention are explained in the following description and depicted in the illustrations in which.

DESCRIPTION AND OPERATION

Figure 1:
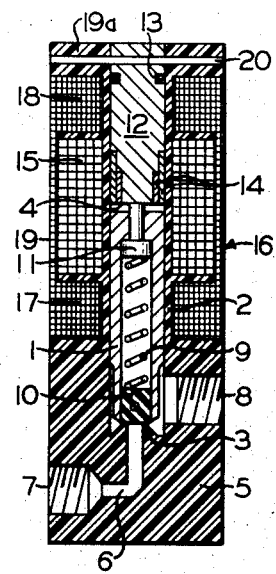
FIG. 1 represents a two-position, two-port electrovalve, according to the invention, with a magnetic member produced by continuous winding.
Figure 2:
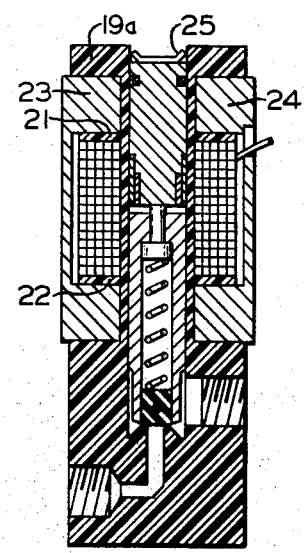
FIG. 2 represents a two-position, two-port electrovalve, with a magnetic member consisting of two assembled half-shells joined in an axial plane.
Figure 3:
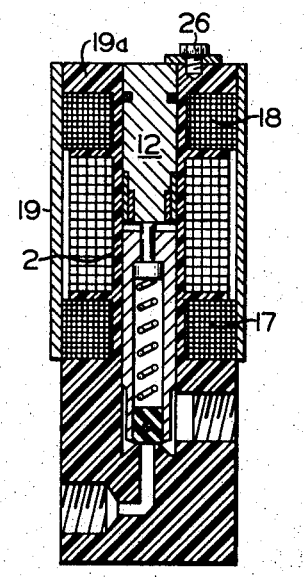
FIG. 3 is a variation of the electrovalve of FIG. 1, featuring a magnetic member produced by non-continuous winding and addition of a shell not manufactured by winding.

Each of the electrovalves shown in FIGS. 1 to 3 comprise a core plunger 1, which is movable inside a tube 2 of nonmagnetic material between two end stops 3 and 4. Stop 3 is provided in body 5 of the electrovalve, the body being made in one piece with tube 2 in plastic material or metal. The core normally blocks passage 6 in body 5, the passage being provided to connect inlet port 7 with outlet port 8. The core is urged against stop 3 by an internal spring 9 whose one end acts against a poppet 10 that is located inside the tube and engages stop 3 in closing passage 6, and whose other end is supported by poppet 11 which butts against stop 4. A plug 12, fitted with a seal ring 13, carries the stop 4. The core and the plug are preferably fitted in one single bore of tube 2. Plug 12 carries, in addition, a coil 14, the purpose of which is to maintain a magnetic field in the gap between core 1 and plug 12 whenever the alternating current tends to fail.

The electrovalve also includes an induction coil 15 suitable for connection to a source of alternating or direct electric current by a conductor (indicated in FIG. 2), and a magnetic member 16 of good permeability. In the design of FIG. 1, the magnetic member is composed of two annular pole pieces 17 and 18, connected by a sleeve 19, the parts 17, 18 and sleeve 19 being produced from common wire wound in a single, continuous operation. The plug is otherwise fixed in a flange 19a by means of a key 20. The flange is part of body 5 and serves as back-up for part 18 of the magnetic member. Tube 2 carries two external collars 21, 22 which separate the annular parts 17, 18 of the magnetic member from induction coil 15, and thus serve, with the tube, as supporting structure for the coil.

In the construction of FIG. 2, the annular parts 17, 18 and the sleeve 19 belong to two half-shells 23, 24 which are joined in an axial plane and held together either by some fixing medium, or by a sleeve or external liner. The plug 12 is held in flange 19a by a flexible lock piece 25.

With the design of FIG. 3, the annular pole pieces 17, 18 are produced by separate windings of wire. Item 19 consists of a simple sleeve, slipped over the annular pole pieces and flange 19a to form the magnetic member. Plug 12 is held in body 5 by bolt 26 and a retaining disc.

Figure 4:
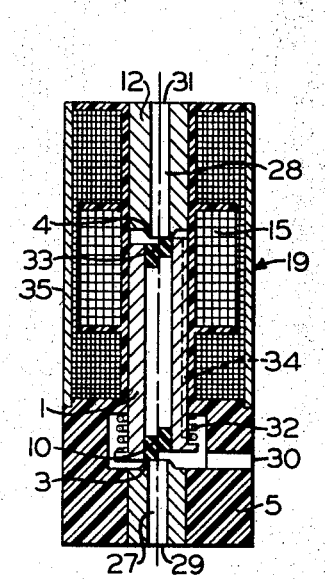
FIG. 4 represents a two-position, three-port electro-air valve, according to the invention.

With the construction of FIG. 4, the valve features two positions, passages 27 and 28, and three ports 29, 30, 31, whereby 29 represents the inlet port, 30 the delivery connection, and 31 the exhaust port. A casing 35 of magnetic metal is slipped over the magnetic member, which may be wound similar to that shown in FIG. 1. The core plunger 1 is shown in the left part of the illustration in the position where its poppet 10 is seated on stop 3 which lies in the path of passage 27. The core is pushed into this position by spring 32 which abuts at one end on body 5 and on the other on a flange of the core. On the right hand side of FIG. 4, core 1 is shown in a position where it is moved up against stop 4 via poppet 33 which is mounted in the core. Stop 4 is located across passage 28. One or more longitudinal grooves 34 provide a connection between the two extreme ends of the core.

The electrovalves shown operate as follows: With the design of FIGS. 1 and 3, when induction coil 15 is deenergized the core plunger finds itself in the position where it cuts off passage 6 shown in the illustrations. When coil 15 is connected to a source of electric current supply, the current creates a magnetic field which produces a magnetic flux that curves itself through the annular part 17, the sleeve 19, the annular part 18, the plug 12 and the plunger 1; the latter is attracted upward against the load of spring 9, reduced by the force created by the fluid pressure, and opens the fluid passage between ports 7 and 8. With the design of FIG. 4, upon coil 15 being deenergized, the core plunger occupies the position shown at the left of the illustration. When current flows through induction coil 15, the magnetic flux generated causes raising of core 1 and closure of passage 28 (which connects ports 30 and 31), as well as opening of passage 27 (which connects ports 29 and 30).

Obviously, modifications to the electrovalves described can be provided within the confines of this invention. The fluid can be a liquid or a gas, for example compressed air. The deposition of the fluid paths does not constitute an object of this invention, and the application can be enlarged to also cover an electrovalve with more than two positions and passages respectively. The electric power supply to the induction coil can be AC or DC; in the latter case the auxiliary coil becomes unnecesary.

With the designs indicated, it can be seen that perfect centering of the core plunger is obtained by machining a bore in a monoblock body, in one single operation, and by providing a very compact magnetic member, involving small losses only by eddy currents, by means of a single winding operation (FIGS. 1 and 4), or two simultaneous or successive winding operations (FIG. 3).

Having now described the invention, what I claim as new and desire to secure by Letters Patent, is:

1. An electrovalve comprising:
   a. a core plunger disposed within the bore of a nonmagnetic tubular member for movement between a pair of end stops, said bore having passage means connected thereto, in which the flow of fluid pressure is controlled by the cooperative relationship of said core plunger with a respective one of said end stops;
   b. an induction coil to which a source of electric current is connected, said coil being carried by said tubular member in surrounding relationship with a portion of said core and a portion of a magnetic plug mounted at one end of the tubular member where said plug forms a first one of said end stops;
   c. a magnetic member formed of a material having good magnetic permeability and disposed about the periphery of said coil in generally conforming alignment with the periphery of said tubular member, said magnetic member including an annular pole piece adjacent each end of said coil, said magnetic member, said plug and said core plunger providing a magnetic flux circuit for said coil whereby said pole pieces magnetically connect said magnetic member across said tubular member with said plug and said core plunger when said coil is energized to effect movement of said core plunger; and d. a pair of external collars concentric with the bore of said tubular member, each of said collars separating said induction coil and a respective one of said annular pole pieces to provide in cooperation with said tubular member the supporting structure for said coil, said tubular member further including a pair of shoulders concentric with said bore, each spaced apart from a respective one of said collars to form in cooperation therewith means forming the support structure for said magnetic member.

2. The electrovalve of claim 1 further characterized in that said tubular member and said fluid passageway are provided in a unitary body.

3. The electrovalve of claim 1 further characterized in that said collars are formed integral with said tubular member.

4. The electrovalve of claim 1 wherein said core plunger includes a first poppet valve engageable with a first valve seat formed by a second one of said end stops at the juncture of said bore and a first passageway of said passage means.

5. The electrovalve of claim 1 wherein said magnetic member further includes a sleeve of generally annular shape that surrounds said induction coil and magnetically connects said annular pole pieces to each other.

6. The electrovalve of claim 5 wherein said magnetic member including said pole pieces and said sleeve is comprised of a pair of half-shells joined together to provide said armature.

7. The electrovalve of claim 6 further characterized in that the half-shells of said magnetic member are joined in an axial plane.

8. The electrovalve of claim 1 wherein the pole pieces of said magnetic member are assembled over the induction coil by means of a sheath for channeling the magnetic flux.

9. The electrovalve of claim 8, further characterized in that the pole pieces of said magnetic member and said sheath are wound from common wire.

10. The electrovalve of claim 1 wherein said magnetic plug carries an auxiliary coil near its end facing said core plunger at a location opposite said induction coil.

11. An electrovalve comprising:
a. a core plunger disposed within the bore of a nonmagnetic tubular member for movement between a pair of end stops, said bore having passage means connected thereto, in which the flow of fluid pressure is controlled by the cooperative relationship of said core plunger with a respective one of said end stops;

b. an induction coil to which a source of electric current is connected, said coil being carried by said tubular member in surrounding relationship with a portion of said core and a portion of a magnetic plug mounted at one end of the tubular member where said plug forms a first one of said end stops;

c. a magnetic member formed of a material having good magnetic permeability and disposed about the periphery of said coil in generally conforming alignment with the periphery of said tubular member, said magnetic member including an annular pole piece adjacent each end of said coil, said magnetic member, said plug and said core plunger providing a magnetic flux circuit for said coil whereby said pole pieces magnetically connect said magnetic member across said tubular member with said plug and said core plunger when said coil is energized to effect movement of said core plunger, said tubular member having an integral flange at the plug end thereof to provide a back-up for supporting said magnetic member.

12. An electrovalve comprising:
a. a core plunger disposed within the bore of a nonmagnetic tubular member for movement between a pair of end stops, said bore having passage means connected thereto, in which the flow of fluid pressure is controlled by the cooperative relationship of said core plunger with a respective one of said end stops;

b. an induction coil to which a source of electric current is connected, said coil being carried by said tubular member in surrounding relationship with a portion of said core and a portion of a magnetic plug mounted at one end of the tubular member where said plug forms a first one of said end stops;

c. a magnetic member formed of a material having good magnetic permeability and disposed about the periphery of said coil in generally conforming alignment with the periphery of said tubular member, said magnetic member including an annular pole piece adjacent each end of said coil consisting of a coil of wire material having good magnetic permeability, said magnetic member, said plug and said core plunger providing a magnetic flux circuit for said coil whereby said pole pieces magnetically connect said magnetic member across said tubular member with said plug and said core plunger when said coil is energized to effect movement of said core plunger.

13. The electrovalve of claim 12, further characterized in that the wire coil forming said pole pieces is provided with an insulation on its surface.

* * * * *